(12) United States Patent
Blumer et al.

(10) Patent No.: US 10,661,907 B2
(45) Date of Patent: May 26, 2020

(54) HYBRID PNEUMATIC AND ELECTRIC SECONDARY POWER INTEGRATED CABIN ENERGY SYSTEM FOR A PRESSURIZED VEHICLE

(71) Applicant: HONEYWELL INTERNATIONAL INC., Morris Plains, NJ (US)

(72) Inventors: Eric Blumer, Scottsdale, AZ (US); David K Jan, Fountain Hills, AZ (US); Cristian Anghel, Oro Valley, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 455 days.

(21) Appl. No.: 15/353,967

(22) Filed: Nov. 17, 2016

(65) Prior Publication Data
US 2018/0134396 A1    May 17, 2018

(51) Int. Cl.
*B64D 13/06* (2006.01)
*B64D 33/00* (2006.01)
*F02C 6/08* (2006.01)
*F01D 15/08* (2006.01)
(Continued)

(52) U.S. Cl.
CPC ............. *B64D 13/06* (2013.01); *B64D 13/02* (2013.01); *B64D 33/00* (2013.01); *B64D 41/00* (2013.01); *F01D 15/08* (2013.01); *F02C 6/08* (2013.01); *B64D 2013/0611* (2013.01); *F05D 2220/50* (2013.01); *Y02T 50/54* (2013.01); *Y02T 50/56* (2013.01)

(58) Field of Classification Search
CPC ............ B64D 13/06; B64D 2013/0603; B64D 2013/0611; F05D 2220/50; F02C 6/08; Y02T 50/56
See application file for complete search history.

(56) References Cited

U.S. PATENT DOCUMENTS

| 2,777,301 A | 1/1957 | Kuhn |
| 3,711,044 A * | 1/1973 | Matulich ................ B64D 13/06 |
| | | 244/118.5 |
| 4,091,613 A | 5/1978 | Young |
| (Continued) | | |

FOREIGN PATENT DOCUMENTS

| EP | 0 694 472 A1 | 1/1996 |
| EP | 0694472 A1 | 1/1996 |
| (Continued) | | |

OTHER PUBLICATIONS

European Search Report dated Mar. 19, 2018, Application No. EP 17200891.4.
(Continued)

*Primary Examiner* — William H Rodriguez
*Assistant Examiner* — Thomas P Burke
(74) *Attorney, Agent, or Firm* — Shumaker & Sieffert, P.A.

(57) ABSTRACT

A system for providing compressed air to pneumatic loads in a vehicle such as an aircraft, the system includes a gas turbine engine having; a) an engine compressor with an air inlet coupled to an interior of a cabin of the vehicle; and b) a load compressor coupled to the gas turbine engine having a compressed air outlet coupled to one or more pneumatic loads of the vehicle. One or more electrically driven cabin air compressors (CAC) have compressed air outlets coupled to the one or more pneumatic loads.

4 Claims, 3 Drawing Sheets

(51) Int. Cl.
*B64D 13/02* (2006.01)
*B64D 41/00* (2006.01)

(56) References Cited

U.S. PATENT DOCUMENTS

| | | | | |
|---|---|---|---|---|
| 4,419,926 A * | 12/1983 | Cronin | B64D 13/06 | |
| | | | 237/11 | |
| 5,511,385 A * | 4/1996 | Drew | B64D 13/06 | |
| | | | 62/172 | |
| 5,956,960 A * | 9/1999 | Niggeman | B64D 13/06 | |
| | | | 60/785 | |
| 6,283,410 B1 * | 9/2001 | Thompson | B64D 41/00 | |
| | | | 244/59 | |
| 7,578,136 B2 | 8/2009 | Derouineau et al. | | |
| 7,607,318 B2 | 10/2009 | Lui et al. | | |
| 7,797,962 B2 | 9/2010 | Kresser et al. | | |
| 2007/0284480 A1 * | 12/2007 | Atkey | B64D 13/06 | |
| | | | 244/135 R | |
| 2009/0275276 A1 | 11/2009 | Montero et al. | | |
| 2010/0044504 A1 * | 2/2010 | Cazals | B64D 33/02 | |
| | | | 244/58 | |
| 2012/0006935 A1 * | 1/2012 | Bhargava | B64C 25/405 | |
| | | | 244/50 | |

FOREIGN PATENT DOCUMENTS

| | | |
|---|---|---|
| EP | 1 860 026 A2 | 11/2007 |
| EP | 1860026 A2 | 11/2007 |
| EP | 2 998 225 A1 | 3/2016 |
| EP | 2998225 A1 | 3/2016 |
| WO | 2004037641 A2 | 5/2004 |

OTHER PUBLICATIONS

Search Report from EP application No. 17200891.4 dated Mar. 19, 2018.
Examination Report from counterpart European Application No. 17200891.4, dated Dec. 9, 2019, 5 pp.
Response to Extended Search Report dated Mar. 19, 2018, from counterpart European Application No. 17200891.4, dated Jun. 5, 2018, 13 pp.
Response to Examination Report dated Dec. 9, 2019, from counterpart European Application No. 17200891.4, dated Mar. 11, 2020, 5 pp.
Response to Examination Report dated Dec. 9, 2019, from counterpart European Application No. 17200891.4, dated Mar. 17, 2020, 3 pp.

* cited by examiner

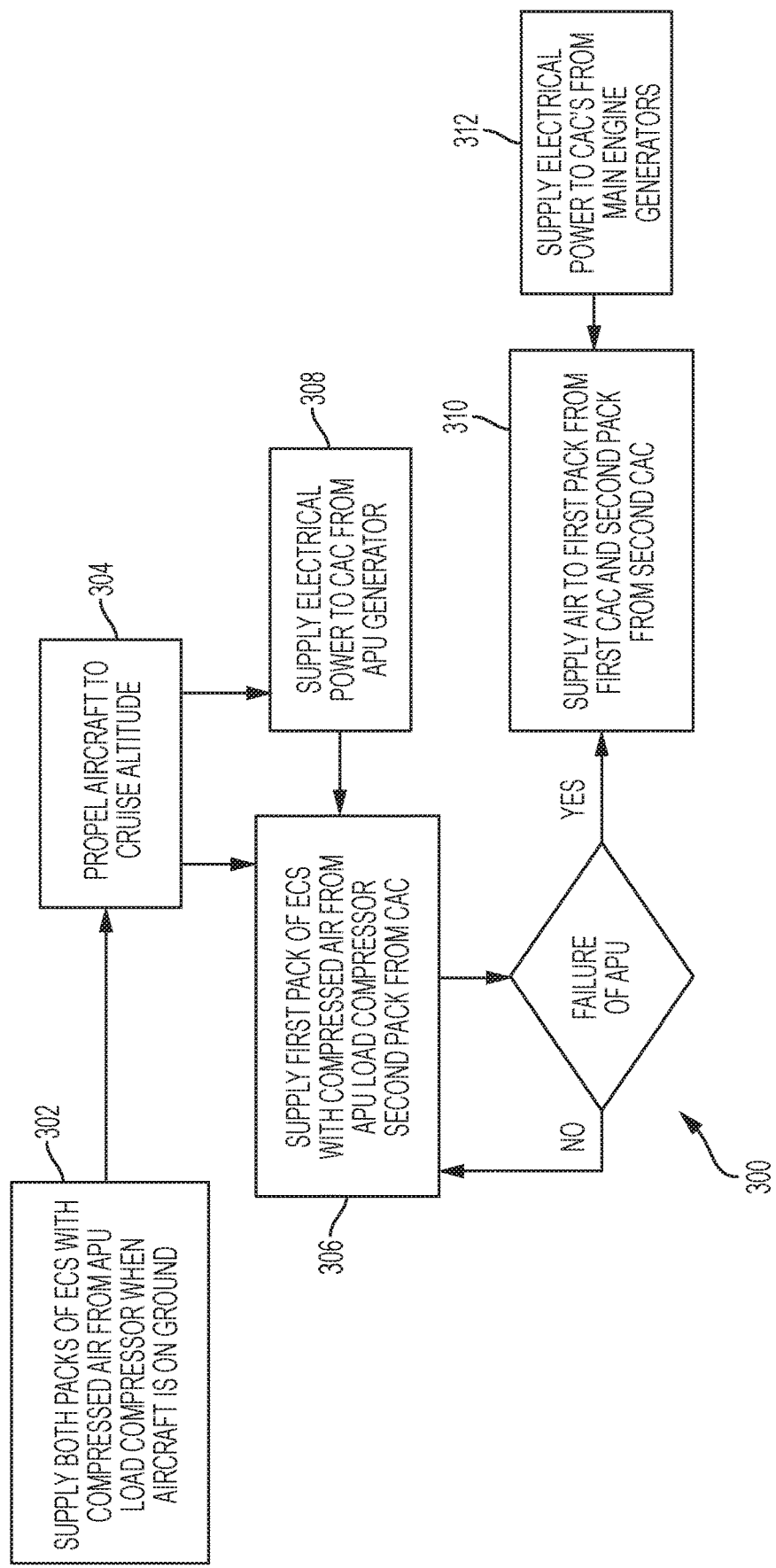

HYBRID PNEUMATIC AND ELECTRIC SECONDARY POWER INTEGRATED CABIN ENERGY SYSTEM FOR A PRESSURIZED VEHICLE

BACKGROUND OF THE INVENTION

The present invention relates generally to providing pressurized air and electrical power to perform various functions on a vehicle such as an aircraft. More particularly, the invention relates to systems which eliminate a need to extract bleed air and reduce extraction of electrical power from main engines of the vehicle.

Future aircraft, including future main engines and future subsystems, are being developed to achieve ever increasing levels of fuel efficiency to reduce the cost of travel while at least maintaining if not improving safety and dispatch reliability. Aircraft engine and subsystems all need to be designed such that they work together to collectively enable this overall fuel efficiency improvement. More efficient engine cycles will continue to drive core flows down by pushing engine pressures and temperatures up. This has made both traditional bleed architectures and no-bleed, more-electric architectures increasingly difficult to integrate with subsystem loads. Bleed architectures have been more difficult because the required bleed air flows for environmental control systems (ECS) are a larger percentage of the total available main engine core flow. Also bleed flow temperatures in the bleed air systems, especially in valves between main engine and pre-coolers and in the pre-coolers themselves, have become more difficult to manage. Therefore consideration has been given to in-flight operation of an auxiliary power unit (APU) to offload large bleed air and or electric loads from the main engines. If such in-flight operation of an APU could be successfully implemented, the main engines could adopt more efficient cycles without being as constrained by the bleed and or electric power interfaces.

But this approach has not been adopted by any major platform at least partly because of challenges arising from obtaining efficient APU performance during both ground and in-flight conditions. Additionally there has not been an effective system devised to meet certification and safety in the event of an in-flight APU failure.

In more electric aircraft, electrical redundancy is typically provided by configuring each main engine with multiple generators. This multiplicity of main-engine generators results in substantial undesirable increase in weight of the aircraft.

As can be seen, there is a need for supplying pneumatic and electrical power on a vehicle without employing main engine energy. Also, there is a need for a power architecture in which operation of an APU is a principal source of pneumatic and electrical power. Still further, there is a need for such an architecture in which failure of the APU can be tolerated within certification and safety standards without incurring a need for a multiplicity of main-engine generators.

SUMMARY OF THE INVENTION

In one aspect of the present invention, a system for providing compressed air to pneumatic loads of a vehicle, the system comprises: a gas turbine engine having: a) an engine compressor with an air inlet coupled to an interior of a cabin of the vehicle; and b) a load compressor coupled to be driven by the gas turbine engine having a compressed air outlet coupled to one or more pneumatic loads of the vehicle; and one or more electrically driven cabin air compressors (CAC) having compressed air outlets coupled to the one or more pneumatic loads.

In another aspect of the present invention, an environmental control system (ECS) for a vehicle comprises: a first pneumatically-driven pack; a second pneumatically-driven pack; and a controller; wherein the controller is configured to pneumatically couple the first and the second pack to a load compressor of gas turbine engine during a first mode of operation of the vehicle; wherein the controller is configured to pneumatically de-couple the first pack from the load compressor during a second mode of operation of the vehicle; and wherein the controller is configured to pneumatically couple the first pack to a cabin air compressor (CAC) during the second mode of operation of the vehicle.

In still another aspect of the present invention, a method for maintaining environmental control in a vehicle comprises the steps of: operating an auxiliary power unit (APU) of the vehicle; driving a first pack of an environmental control system (ECS) with compressed air from a load compressor of the APU; and driving a second pack of the ECS with compressed air from a cabin air compressor (CAC).

These and other features, aspects and advantages of the present invention will become better understood with reference to the following drawings, description and claims.

BRIEF DESCRIPTION OF THE DRAWINGS

FIG. 3 is a flow chart of a method for maintaining environmental control in a vehicle in accordance with an exemplary embodiment of the invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally may provide a system for supplying pneumatic and or electrical power in a vehicle without employing main engine energy. More particularly, the invention may provide a power architecture in which operation of an APU is a principal source of pneumatic and electrical power. Still further, the invention may provide that shutdown or failure of the APU can be tolerated within certification and safety standards.

Figure 1:
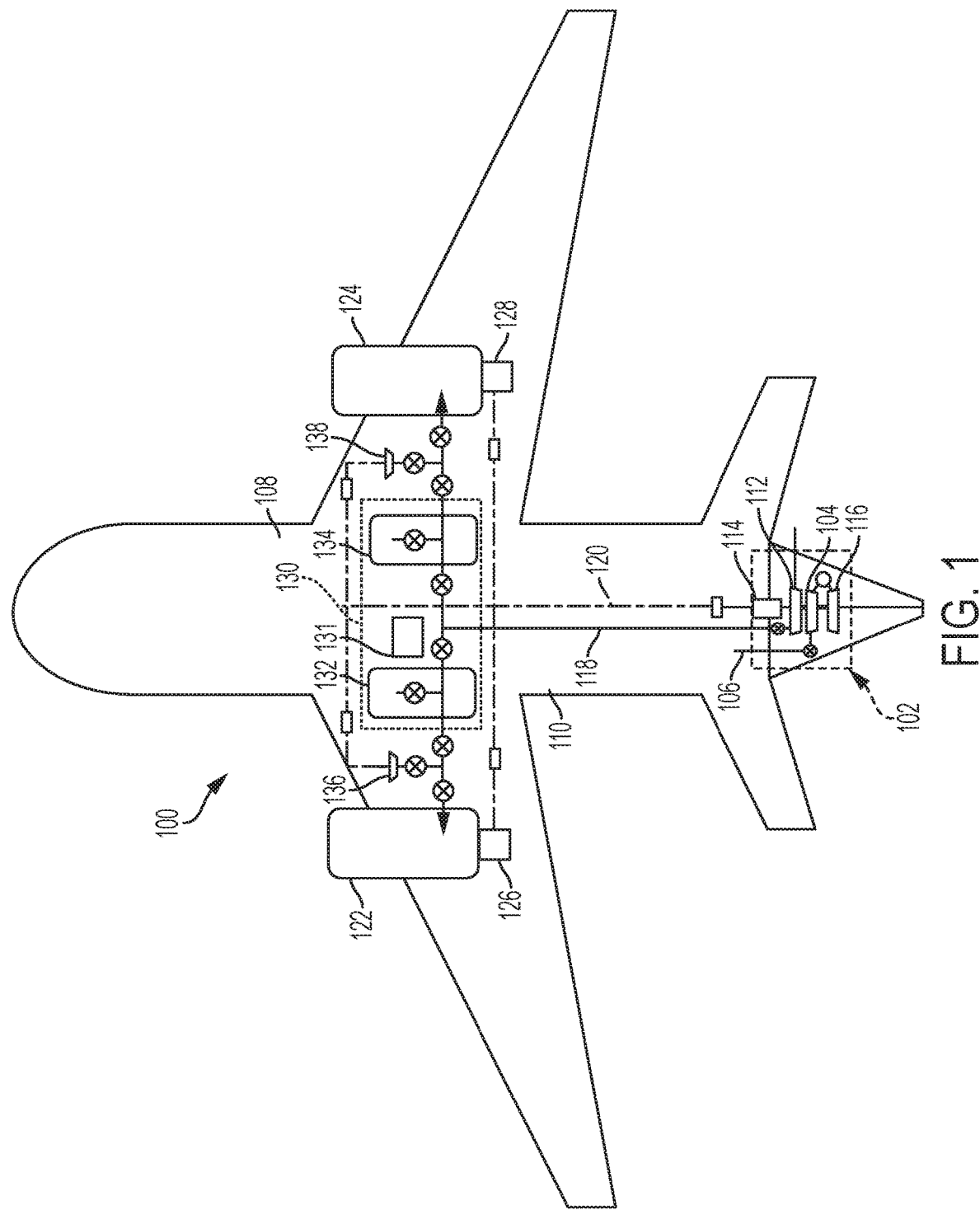
FIG. 1 is a schematic diagram of a pneumatic and electrical power system in accordance with an exemplary embodiment of the invention.

Referring now to FIG. 1, an exemplary embodiment of a power system 100 may include a gas turbine engine or power unit 102 (hereinafter referred to as an auxiliary power unit [APU]) having an engine compressor 104 with an air inlet 106 coupled to an interior of a pressurized cabin 108 of a vehicle such as an aircraft 110. The APU 102 may also include a load compressor 112 and an electrical generator 114, both of which may be driven by a turbine 116. An output of the load compressor 112 may be coupled to a pneumatic duct system 118 of the aircraft 110. An output of the generator 114 may be coupled to an electrical power system 120 of the aircraft 110.

The aircraft 110 may have two or more main engines, a left-hand (LH) engine 122 and a right-hand (RH) engine 124. Each of the engines 122 and 124 may be coupled to a main-engine electrical generator 126 and 128 respectively. The aircraft may also include an environmental control system (ECS) 130. The ECS 130 may include a controller 131 and two pneumatically-driven packs, a left-hand (LH) pack 132 and a right-hand (RH) pack 134. Packs 132 and 134 can be air cycle or vapor cycle systems. The controller 131 may be configured provide commands to couple or de-couple either or both of the packs 132 and 134 to or from the pneumatic duct system 118.

Pneumatic power for the aircraft 110 may be provided by compressed air emerging from the load compressor 112 of the APU 102 or from one or more electrically driven cabin air compressors (CAC) 136 and 138. It may be noted that, even though the pneumatic duct system 118 is connected with the main engines 122 and 124, the main engines may not supply pneumatic power to the aircraft 110. The main engines 122 and 124 may consume compressed air during engine starting and de-icing operations.

Varying optimized combinations of pneumatic and electrical power may be employed during various operational modes of the aircraft 110. In a first mode of operation of the vehicle or aircraft 110, for example on the ground, the APU 102 may provide all requisite compressed air and pressure for pneumatic loads such as both of the packs 132 and 134 of the ECS 130. In this context the APU 102 may be sized and may have performance characteristics which are substantially the same as those of conventional APU's used in similarly sized aircraft. In other words, having the inlet 106 of the engine compressor 104 connected to the inside of the unpressurized cabin 108 may not require unique sizing of the APU 102.

As the aircraft 110 enters a second mode of operation in which it takes off and climbs, the outside pressure drops. Compressed air corrected flow required by the ECS packs 132 and 134 may increase significantly, approximately 3 times from sea level to 41,000 ft. But, because the inlet 106 of the engine compressor 104 may be connected to the inside of the pressurized cabin 108, the APU 102 may maintain the power output required for the ECS 130. However, the APU 102 load compressor 112 may not be able to meet altitude corrected flow requirements of the ECS 130. In that case, one of the CAC's 138 or 140 may be used in flight at higher altitudes to augment compressed air flow delivered by the APU 102. If each of the two CAC's 136 and 138 have substantially the same flow and pressure sizing as the APU load compressor 112, then running one CAC may provide all the flow required by one of the packs 132 or 134. The APU load compressor 112 may then provide all the flow required by the other pack. Speed of the APU 102 and the CAC may be adjusted to match requisite pressures. Electrical power for the CAC may be provided by the APU generator 114.

Thus, when the APU 102 is providing all the compressed air for at least one of the packs 132 or 134 and electrical power for the CAC 136 or 138, the main engines 122 and 124 may have freedom to achieve high efficiency without any constraints from either pneumatic loads or electric loads due to ECS needs. Some improvement in thrust production efficiency may occur from operation of the APU 102 during flight because the APU 102 may be positioned so that its exhaust may provide forward thrust.

In the event of inoperability of the APU 102, each of the packs 132 and 134 may be supplied with compressed air by a respective one of the CAC's 136 or 138. Thus, the CAC's 136 and 138 may provide requisite redundancy for APU inoperability. In that case, the main-engine generators 126 and 128 may be required to provide all the electric power required to drive the CAC's 136 and 138. It is expected that an APU failure condition may require some operability constraints on the main engines 122 and 124 so that they may provide enough electric power. These constraints may include, for example, added use of engine surge bleed flow, changed transient allowable rates to avoid surge and/or increases in allowable flight idle speeds. These operability constraints may be expected to cause overall aircraft fuel burn increases and aircraft operability changes, but these fuel burn increases and aircraft operability changes may be acceptable in the limited time under this failure condition.

It may be noted that unlike prior-art more-electric aircraft (MEA), the aircraft 102 may need only a single generator for each of the main engines 122 and 124. Within the context of the exemplary embodiment of the aircraft of FIG. 1, such single generators may provide enough torque for some electric starting conditions, and redundancies to achieve acceptable cabin pressurization and cooling in flight. The single main engine generators may be adequate for redundancy since each main engine generator and the APU generator can provide a full electric bus rating at all flight conditions. Thus, a main engine in-flight shutdown, loss of a main engine generator, APU in-flight shutdown or loss of an APU generator may not result in any loss of normal compressed flow to the two packs 132 and 134 of the ECS 130. This is an improvement of prior-art redundancy where in cases of an engine in-flight shutdown, ECS flow must be doubled from the remaining engine or be reduced due to the failure. In the aircraft of FIG. 1, the CAC's 136 and 138 may provide compressed air for starting a main engine. Electrical power for the CAC's may be provided by the other main engine or the APU 102. The APU 102 can provide compressed air from load compressor 112 for main engine 122 or 124 starting.

Figure 2:
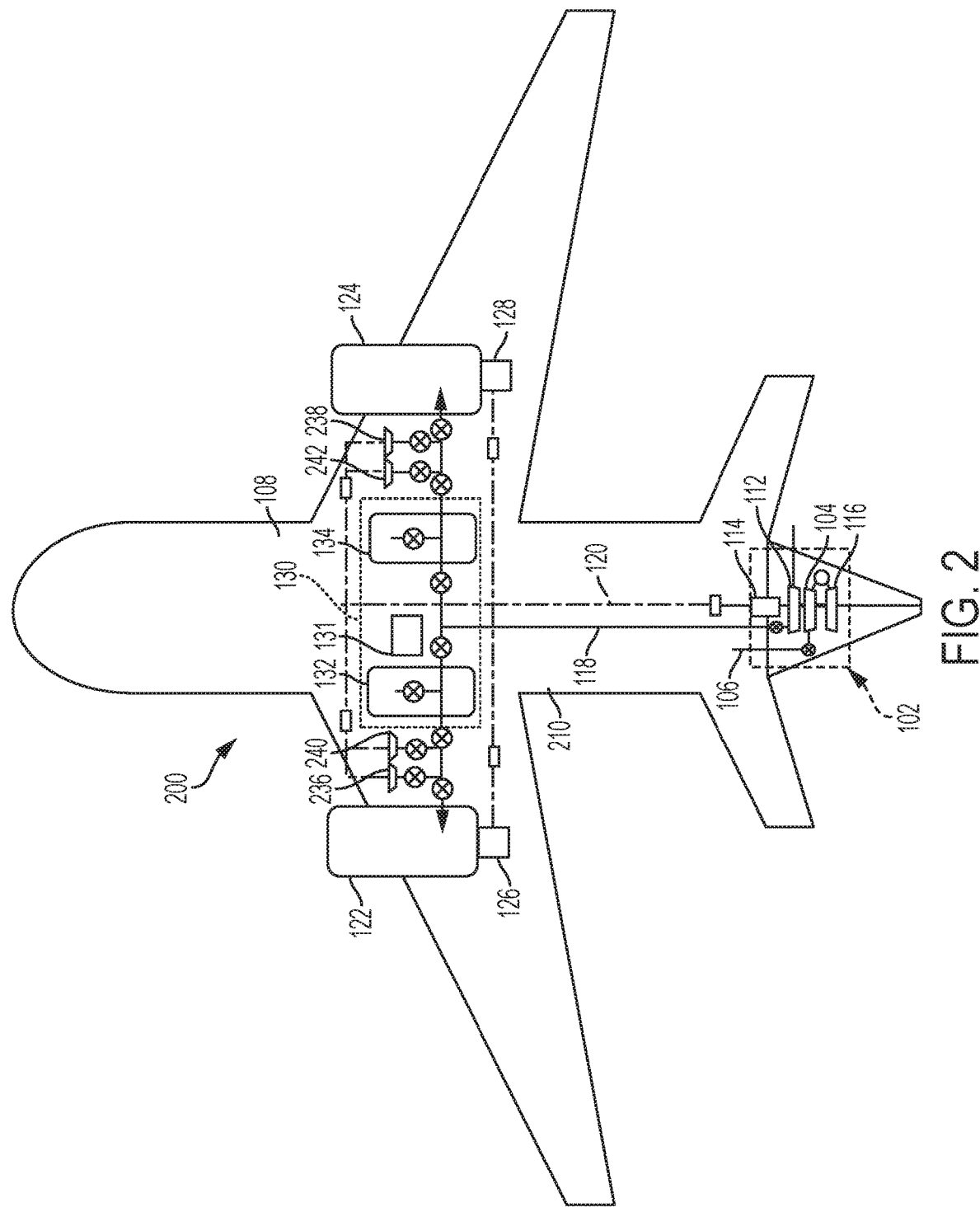
FIG. 2 is a schematic diagram of a pneumatic and electrical power system in accordance with a second exemplary embodiment of the invention.

In aircraft designs requiring increased redundancy, it may be desirable to configure an aircraft 210 as shown in FIG. 2. The aircraft 210 may include a power system 200 and four CAC's 236, 238, 240 and 242. These four CAC's may each have the same pressure ratio as those shown in the aircraft 110 of FIG. 1, but may they may each have half the flow capability.

The architecture shown in FIGS. 1 and 2 applied to an aircraft may allow a hybrid electric and pneumatic system to achieve a level of efficiency and efficient redundancy not presently available in all-pneumatic or all-electric architectures. As an example, for a 120-200 seat airplane, the total electric power needed for the 2 or 4 CACs maybe in the range of 120 kW to 180 kW. Either of the two main engine generators 126 or 128 or the APU generator 114 may be capable of supplying 120 kW to 180 kW. Thus, provisions for main engine starting, anti-icing air flow, ground ECS operation, flight ECS operation, and failure mode operation may be provided without incurring high weights of redundant multiple main-engine generators such as those required in prior-art MEA aircraft.

Referring now to FIG. 3, a flow chart illustrates a method 300 for maintaining environmental control in an aircraft cabin. In a step 302, both packs of an ECS may be supplied with compressed air from an APU load compressor when an aircraft is on the ground (e.g. load compressor 112 may supply compressed air to pneumatic duct system 118 and, under commands of the controller 131, the packs 132 and 134 may be supplied with compressed air). In step 304, the aircraft 110 or 210 may be propelled to altitude and pressurize. In a step 306, a first pack of ECS may be supplied with compressed air from APU load compressor and a second pack may be supplied from a CAC (e.g., under the commands of the controller 131, the pack 132 may be supplied from load compressor 114 and the pack 134 may be supplied by the CAC 138). In a step 308, the CAC may be supplied with electrical power from the APU generator (e.g., under commands of the controller 131, the CAC 138 may be supplied with electrical power from the APU generator 114). In a step 310, a first pack may be supplied with compressed air from first CAC and a second pack may be supplied from a second CAC in the event of inoperability of the APU. In a step 312, electrical power may be supplied to the CAC's from main-engine generators in the event of inoperability of the APU or the APU generator or failure of electrical load management.

It should be understood, of course, that the foregoing relates to exemplary embodiments of the invention and that modifications may be made without departing from the spirit and scope of the invention as set forth in the following claims.

We claim:

1. A system for providing compressed air to pneumatic loads of a vehicle, the system comprising:
   a gas turbine engine that is an auxiliary power unit (APU) and has an engine compressor that receives air from an interior of a cabin of the vehicle;
   a load compressor driven by the gas turbine engine, wherein an output of the load compressor supplies compressed air to one or more pneumatic loads;
   an electrical generator driven by the gas turbine engine, wherein an output of the electrical generator is coupled to an electrical power system of the vehicle; and
   one or more electrically driven cabin air compressors (CACs) supplying compressed air to the one or more pneumatic loads, wherein at least one CAC receives electrical power from a main engine of the vehicle;
   wherein, at least one CAC provides compressed air to start another main engine of the vehicle;
   wherein, in a first mode of operation of the vehicle, the APU provides all requisite compressed air and pressure for the one or more pneumatic loads;
   wherein, in a second mode of operation of the vehicle, one of the CACs augments compressed air flow still being delivered by the APU to the one or more pneumatic loads;
   wherein, in a third mode of operation of the vehicle, when the APU is inoperable due to a failure, a respective CAC provides compressed air to each of the one or more pneumatic loads, and main engine generators of the vehicle provide all electric power required to drive the CACs.

2. The system of claim 1:
   wherein the vehicle is an aircraft; and
   wherein the APU is positioned so that APU exhaust provides forward thrust to the aircraft.

3. The system of claim 1, wherein a main-engine generator of the vehicle is coupled to the one or more CACs to selectively provide electrical power to the one or more CACs when there is inoperability of the APU or the electrical generator, or failure of electrical load management.

4. The system of claim 3, wherein each main engine of the vehicle is configured to drive only one main-engine generator.

* * * * *